C. MORTENSEN.
EMULSER.
APPLICATION FILED MAR. 8, 1917.
1,308,250.
Patented July 1, 1919.
3 SHEETS—SHEET 1.
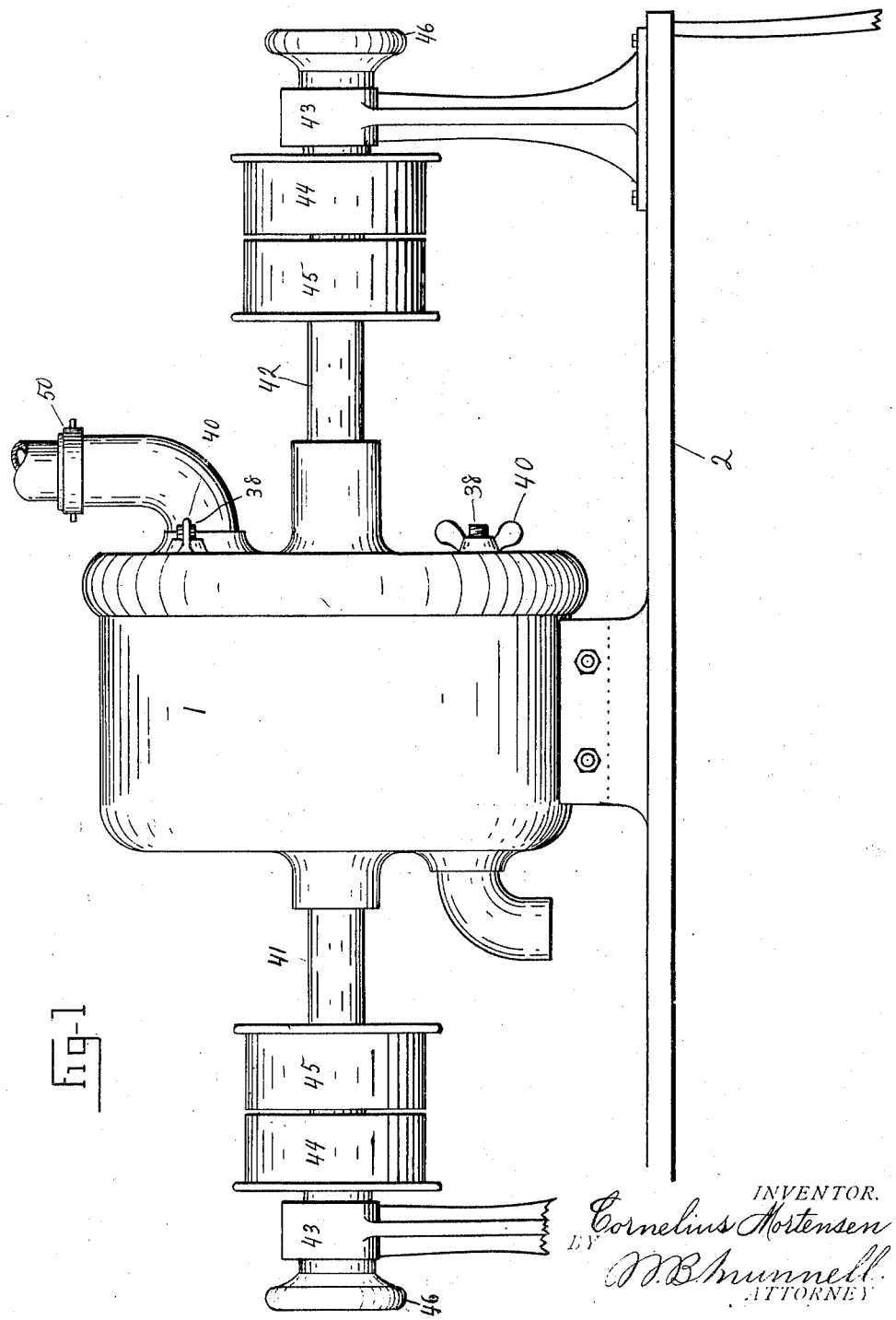
INVENTOR.
Cornelius Mortensen
W.B. Trunnell
ATTORNEY

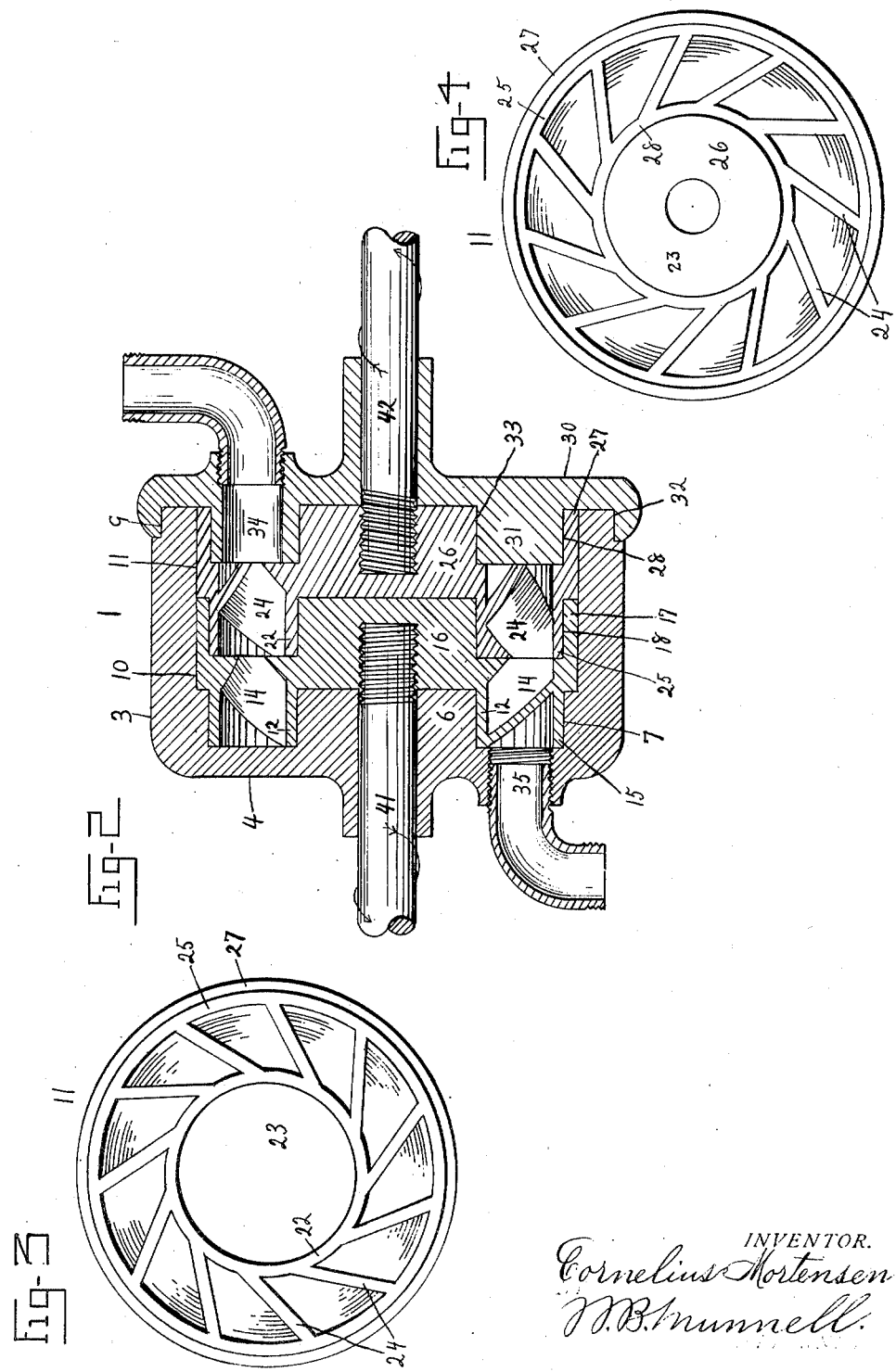

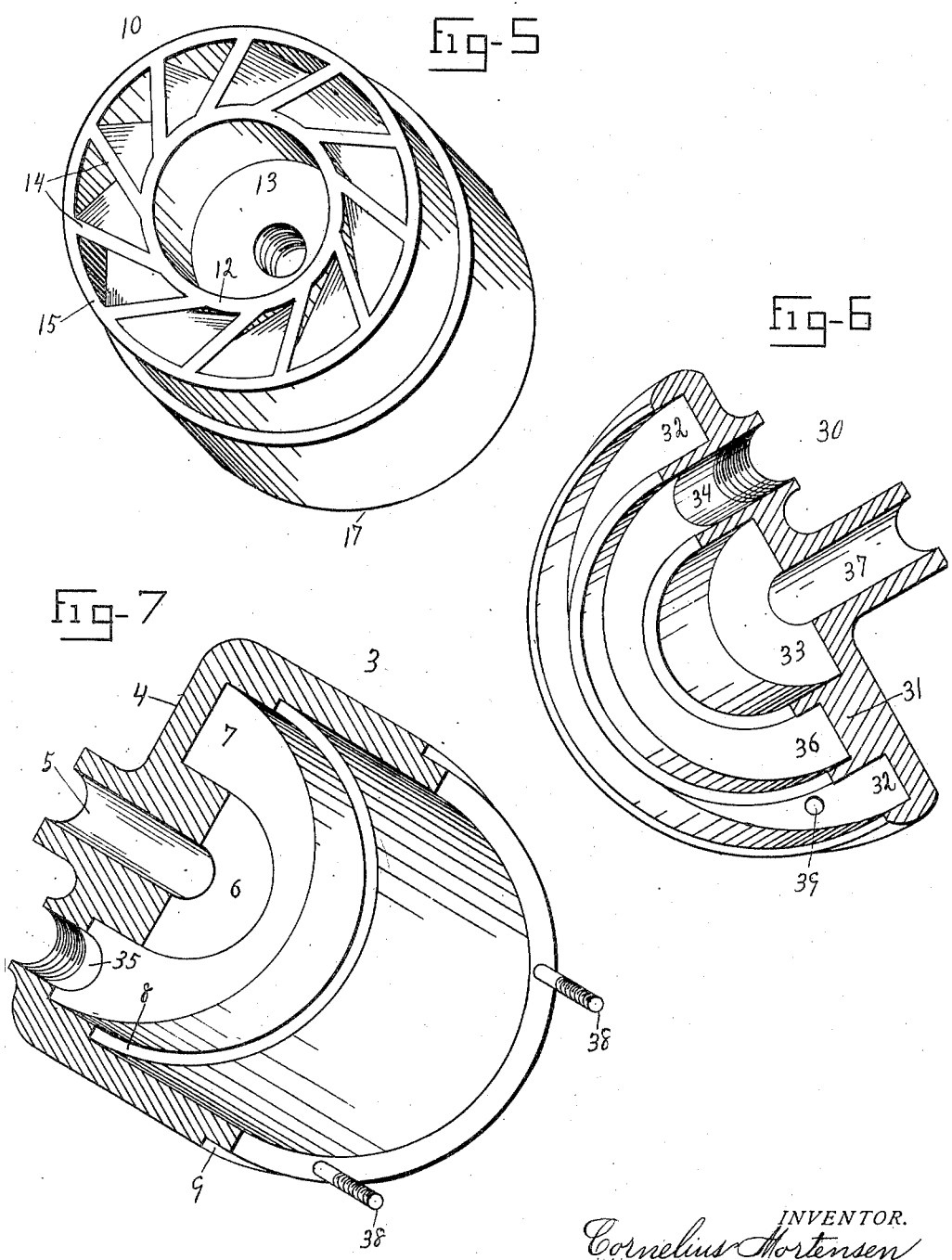

UNITED STATES PATENT OFFICE.

CORNELIUS MORTENSEN, OF LOUISVILLE, KENTUCKY.

EMULSER.

1,308,250.

Specification of Letters Patent.

Patented July 1, 1919.

Application filed March 8, 1917. Serial No. 153,280.

*To all whom it may concern:*

Be it known that I, CORNELIUS MORTENSEN, a citizen of the United States, residing at Louisville, in the county of Jefferson and State of Kentucky, have invented certain new and useful Improvements in Emulsers, of which the following is a specification.

This invention relates to a method and means of commingling molecules of oil and commingling them with a carrying vehicle.

In many arts, use is made of composite substances having an oily content carried in suspension, the percentage whereof is subject to variation, and which it is necessary to maintain at a given standard or the percentage of which it is desirable to vary upon occasion.

The foregoing conditions apply particularly to the ice cream industry. The butter fat in the milk or cream used, varies according to the grade of cows from which the milk is obtained, the food supplied to them, and with the season. Many States have laws which set forth the minimum butter fat content allowable in ice cream.

The price of milk and cream is governed, in a measure, by the content of butter-fat. Hence any excess of butter-fat, over the minimum allowed, will increase the cost of the ice cream, and thus either enhance the selling price or decrease the profit, on the other hand an insufficiency of butter-fat makes the manufacturer liable to prosecution under the law.

The price of butter and milk is further controlled by the proximity of the point of consumption to the point of supply, as neither milk nor ice cream can be transported any great distance, nor stored any considerable length of time. Milk is produced most abundantly in the summer season, and at points removed from congested centers of population, while ice cream is manufactured largely at such centers.

The difficulty due to remoteness of supply may be overcome by extracting the butter fat, and desiccating the milk in proximity to the point of supply.

Butter fat and dried milk will keep indefinitely, and being greatly reduced in bulk, may be economically transported to points far removed from that of production, and there with the addition of water, be reconstituted, with any desired percentage of butter fat, so as not to be recognized from the fresh article.

An object of this invention is to provide means whereby fatty globules suspended in a carrying vehicle may be broken up and thoroughly distributed through said vehicle.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claims.

In the accompanying drawings, comprising three sheets, wherein similar reference characters designate like parts in the several views: Figure 1, is a front elevation of an embodiment of the invention: Fig. 2, a central longitudinal section: Figs. 3 and 4, front and rear elevations respectively of the rear emulsing member: Fig. 5, a perspective view of the forward emulsing member: Fig. 6, a modified form of the cover of the casing in a sectional perspective view, and Fig. 7, a sectional perspective view of the casing.

Referring to the drawings, the reference character —1— designates the emulser, as an entirety, which is suitably secured to, and supported by a table, or stand —2—. The emulser comprises a cylindrical shell, or casing —3— closed at one end by a head —4— having an axial bearing —5— therethrough. A circular boss —6— positioned centrally on the head 4 extends interiorly therefrom a spaced distance, a channel, or runway —7— being formed between the wall thereof and the side wall of the casing. An interior annular rabbet —8— extends forward from the rear end of the casing to a point in the same plane as the end of the boss 6. The casing is provided on its rear or open end with an internal annular rabbet —9—. A pair of rotatable emulsing members —10 and 11— are positioned in the casing and fit as closely therein as is compatible with rapid rotation thereof. The member 10 comprises a forwardly extending annular wall —12— which defines a cup like depression, or socket —13— which is adapted to fit over the boss 6; a plurality of impellers, or fan blades —14— arranged between the wall 12 and a parallel wall —15—, the two walls defining an extension which fits in the channel 7; a rearwardly extended circular boss —16— identical in proportions with the boss 6, which in conjunction with an apron —17— defines a channel or runway —18— the dimensions of which are identical with those of the channel 7 in the casing. The member 11 is identical with the member 10, except that the fan blades are pitched in the opposite direction, so that although the members rotate in the opposite direction they will impart continuous forward motion to the substances passing through them. The pitch of the blades is so calculated that at the speed the machine is designed to operate, in the present instance 3400 R. P. M., rectilinear forward motion only will be imparted to the substances operated upon. The socket 23 of the rear member 11 fits over the boss 16 of the front member 10, while the extension formed by the walls —22, 25— extends into the channel 18. A cover —30— for the casing is provided on its inner surface with an annular rib, or projection —31— of such dimensions that it will fit in the channel 28 of the rear emulsing member and with a socket —33— adapted to fit over the boss 26 of said member. It is also provided with an annular groove —32 adapted to receive the end of the casing and the apron 27, of the rear fan. The cover is provided with an inlet —34— which leads through the rib 31 and is adapted to deliver the substance to be acted upon to the blades 24 of the rear emulsing member. It is to be observed that the milk or other substance, is presented to the first emulsing member in the medial line thereof and passes from the first to the second member in the medial line thereof, and from the second member to an outlet —35— in the medial line of the head. The wide bearings thus provided prevent any leakage past or around the members. The inlet 34 may lead entirely through the rib 31 and deliver milk to the fan blades 24 as they come respectively opposite thereto, or the rib 31 may be provided with an annular channel —36— into which the inlet opens, in which case milk will be delivered to all blades simultaneously. The cover is provided with an axial bearing —37— and is adapted to be positioned on the casing by means of studs —38— which project from the end of the casing through perforations —39— in the cover, and is secured in place by means of thumb nuts —40— engaged on said studs. The emulsing members are removably mounted on the inner ends of the shafts —41, 42— which extend in through the bearings 5 and 37, and are adapted to be rotated in opposite directions. The outer ends of the shafts are carried in bearings —43—. The shafts are each provided with tight and loose pulleys —44—, —45— secured in such manner that they may be readily shifted or removed, and have hand wheels —46— on their outer ends by which they may be easily manipulated. To take the device apart, for cleaning, the supply pipe is disconnected at —50— the thumb nuts removed, the pulleys on the shaft 42 loosened, so that they may slide on the shaft, then by grasping the hand wheel 46, the shaft 42 may be slid longitudinally, withdrawing the cover and the attached emulsing member 11, which may then be removed from the shaft. After the first emulsing member is removed, the operator may grasp the other emulsing member with one hand and with the other manipulate the hand wheel to unscrew shaft 41.

The blades 14 and 24 extend the full width, or height, of the supporting walls 12 and 15 and 22 and 25 respectively, terminating in the same planes as the ends thereof, thereby forming shearing edges. The opposed faces of the emulsing members are in contact and the blades are disposed at an angle to the line of movement, consequently as the members revolve in opposite directions there is a shearing action each time a blade in one member passes a blade in the other member. As illustrated there are eleven blades in each emulsing member, and the members are designed to rotate at the rate of 3400 R. P. M. consequently there will be 411,400 shearing cuts per minute between the two members, there will also be 37,400 shearings at the inlet and outlet openings respectively. It is highly improbable that any particles of a substance passing through the emulser will escape said shearing actions. In addition the fat globules will pass from the first emulsing member with such force that they will strike the approaching blade of the second emulsing member with a disruptive force.

With my improved emulser, normal cream may be produced from butter or butter fat, skim milk, whole milk, dry milk or condensed milk, by reassembling the component parts of cream to their original state.

While I have described my improved device as being used in connection with dairy products, it is not to be understood that its usefulness is limited thereto as it has found use in many arts for homogenizing various substances.

It is thought that the foregoing description will enable anyone skilled in the art pertaining thereto to make and use the same, and having thus described it,

I claim:

1. In a device of the character described, a casing having a cylindrical bore, a head therefor, said head having an interior annular channel, a rotatable element within said casing having an annular projecting member on the forward face thereof and an annular channel in the rear face thereof, a second rotatable element having an annular projecting member on its forward face and an annular channel in its rear face, a closure for the casing having an annular projection on its inner face, the projecting members on the first and second elements and the closure seating in the channels in the head and in the first and second members respectively, the projecting members on the elements having a plurality of passages defined by vanes, the vanes in one member being pitched in the opposite direction to those in the other member, the head having an axial bearing therethrough and an outlet leading from the interior channel therein, the closure having an axial bearing therethrough and an inlet leading through the projecting member thereon, shafts connected respectively with the emulsing elements and extending through said bearings and means for rotating said elements.

2. In a device of the character described, a casing, a rotatable element therein, said element having a plurality of passages defined by vanes, means conveying fluid to and from said passages, means for rotating said element, and means coöperating with said vanes to shear passing fluids.

3. In a device of the character described, an emulsing member comprising a disk, an annular wall extended forward therefrom and defining a cup shape depression, vanes extended at a tangent to said wall, a second annular wall connecting the outer ends of said vanes and an apron extended rearward from said second wall defining an annular channel.

4. In a device of the character described, a casing, a plurality of oppositely rotatable elements therein, each element carrying a plurality of vanes which define passages therethrough, the vanes in one element being pitched in a direction opposite to those in the other element and means for rotating said elements.

5. In a device of the character described, an emulsing member comprising a disk, an annular wall extended forward therefrom and defining a cup shape depression, vanes extended at a tangent to said wall, a second annular wall connecting the outer ends of said vanes, said vanes having sufficient pitch to move a fluid in lines parallel with the axis of the member, and an apron extending rearward from said second wall and defining, in connection with said disk, an annular channel.

6. In apparatus as characterized, the combination of a plurality of disks forming longitudinal passages therethrough and mounted for rotation, and means for delivering a composite substance to said passage.

7. In apparatus as characterized, a casing, a plurality of disks rotatably mounted therein and having self contained means for causing a flow of fluid through said disks.

8. In a device as characterized, the combination of two disks having communicating passages, said disks mounted to rotate, said passages so pitched as to move a fluid therethrough in lines parallel with the axis of the disks.

9. In a device as characterized, the combination of juxtaposed disks mounted to rotate in opposite directions, said disks provided with communicating passages so pitched as to move a fluid therethrough in lines parallel with the axis of the disks.

10. In a device as characterized, a plurality of inter-penetrating members mounted for independent rotation, said members provided with communicating passages so designed as to impart to a fluid a forward movement therethrough in lines parallel with the axis and means for delivering a fluid to said passages.

CORNELIUS MORTENSEN.